July 4, 1933.  A. D. MARROS  1,916,521

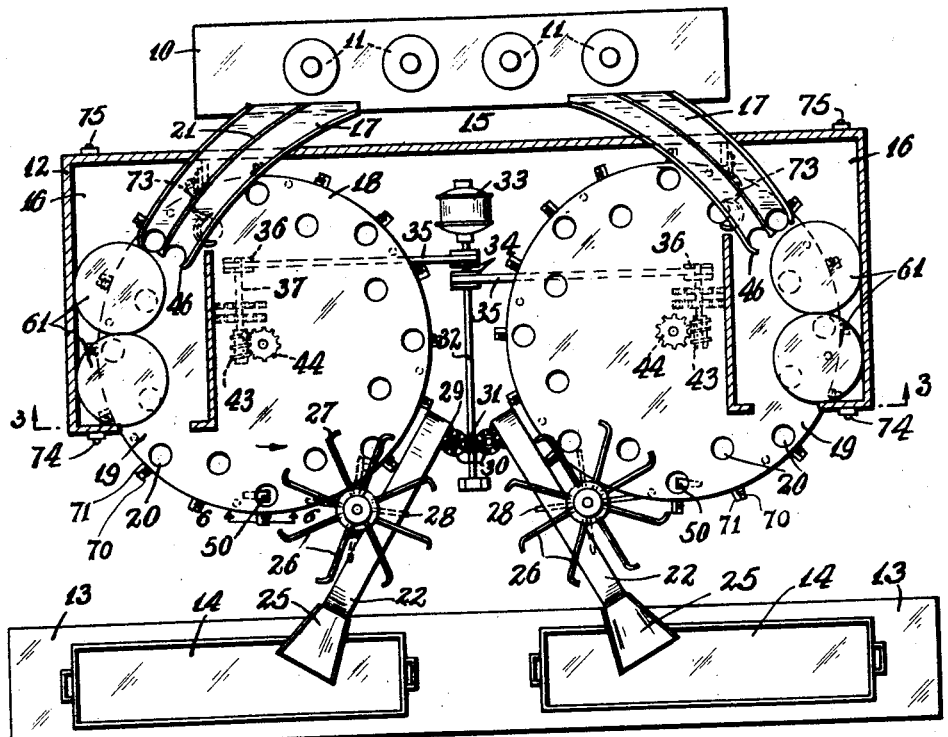

ICE CREAM DISPENSER

Filed July 30, 1932  2 Sheets-Sheet 2

INVENTOR
ARTHUR D. MARROS
BY
ATTORNEY

Patented July 4, 1933

1,916,521

UNITED STATES PATENT OFFICE

ARTHUR D. MARROS, OF NEW YORK, N. Y.

ICE CREAM DISPENSER

Application filed July 30, 1932. Serial No. 626,629.

This invention relates to new and useful improvements in an ice cream dispenser.

The invention has for an object the construction of a device as mentioned which is characterized by the provision of one or more display and carrier discs adapted to hold a plurality of dishes of ice cream or dummies simulating dishes of ice cream and in continuous rotation, and used in conjunction with mechanism for dispensing the ice cream dishes as ordered.

Furthermore, as another object of this invention it is proposed to provide a rear counter from which dishes as ordered may be placed upon a dispensing chute, a front counter upon which the dishes of ice cream are finally discharged, and a dispenser casing between said counters dividing off the view of the rear counter and arranged in a manner so that portions of the dispensing and display discs are visible from the front.

A still further object of this invention is the arrangement of syrup or juice tanks within the dispensing casing and a mechanism for discharging a small measured quantity of the liquid upon the dishes of ice cream as they pass.

A still further object of the invention is the provision of certain mechanism for causing the dishes of ice cream upon the display and carrier discs to be transferred to a conveyer discharging upon the front counter.

The invention still further proposes the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a horizontal sectional view of a device constructed according to this invention.

Fig. 2 is a front elevational view of the device shown in Fig. 1.

Figure 3:
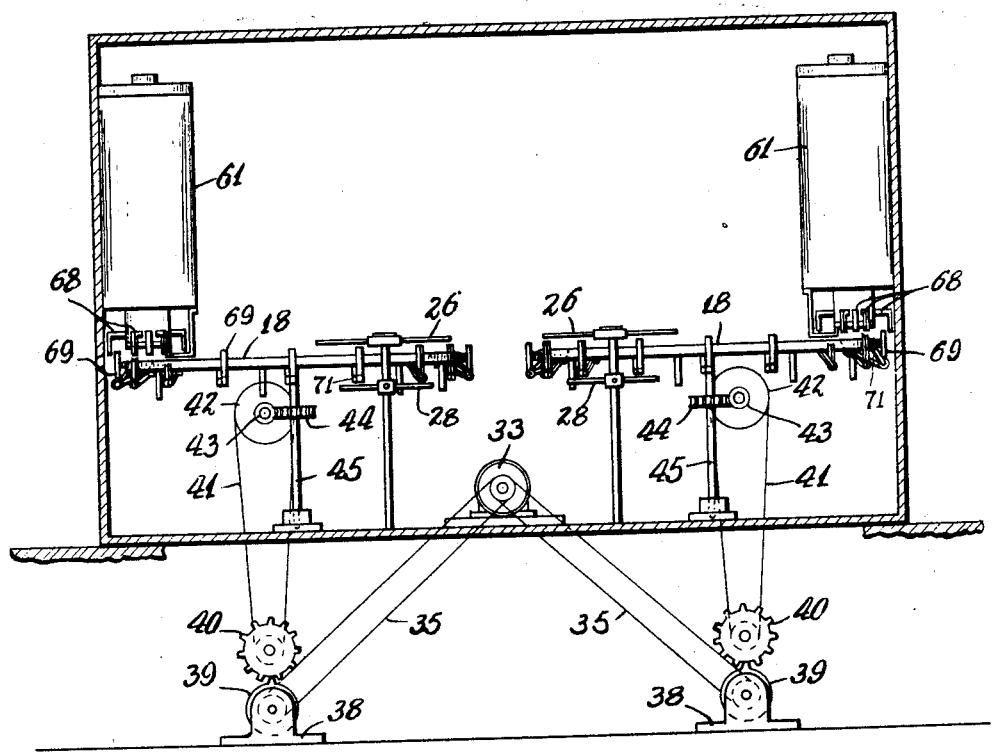
Fig. 3 is a sectional view taken on the line 3—3 of Fig. 1.

The ice cream dispenser according to this invention comprises a back counter 10 provided with a plurality of covered compartments 11 in which ice cream is stored as is conventional, that is, in conjunction with proper refrigeration. To the front of the counter 10 there is located a dispensing casing 12 serving to completely cover the counter 10 and the space in the vicinity thereof. To the front of the dispensing casing 12 there is located a front counter 13 adapted to receive ice cream discharged by the device. Trays 14 are shown upon the front counter 13 for receiving the discharged dishes of the ice cream.

The dispensing casing 12 is composed of a rear wall 15 and end compartments 16. Each of these end compartments, and the rear wall 15 are formed with openings through which loading chutes 17 pass. These chutes extend from the vicinity of the rear counter 10 and discharge at points along the peripheries of display and carrier discs 18 rotatively supported. Each of these carrier discs partially extend into the compartments 16, and at the fronts the compartments 16 are formed with openings 19 through which the dishes of ice cream may pass.

Figure 8:
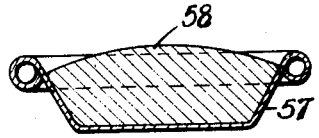
Fig. 8 is a sectional view of a dish of ice cream adapted to be discharged by the device.
Figure 9:
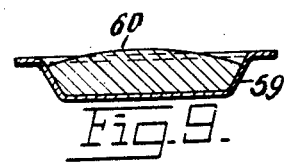
Fig. 9 is a view similar to Fig. 8 but disclosing a dummy or artificial dish of ice cream as used in the device.

The display and carrier discs 18 are formed with a plurality of openings 20 near the edges thereof. These openings are adapted to receive dishes of ice cream, as shown in Fig. 8, or to receive dummy dishes of ice cream shown in Fig. 9. The chute 17 is formed with a double track separated by a partition 21, and openings 20 are arranged upon two diameters of different sizes so that the dishes may be discharged upon one or the other of the circles of openings in the disc 18. Conveyors 22 extend from points along the peripheries of the discs 18 and discharge upon the counter 13. Each of these conveyors comprises an endless belt 23 engaged over rollers 24 spaced from each other. The front ends of the conveyors are equipped with guide plates 25 directed to discharge the ice cream dishes upon the trays 14.

Spiders 26 are rotatively mounted between the discs 18 and the conveyors 22 and are adapted to transfer the dishes of ice cream from the discs to the conveyors. Each of the arms of the spiders 20 are formed with bent portions 27 adapted to hook and engage the portion of ice cream and thus transfer them to the conveyors upon further rotation. Spiders 27 receive their rotation by reason of radial arms 28 projecting from the shafts supporting the spiders and engaging against pins 18' projecting from the discs 18. The conveyors 22 are driven by a drive system which includes bevel gears 29 upon one of the rollers of each of the conveyors and meshing with bevel gears 30 upon a driven system including a worm 31 of the driving shaft 32 connected with an electric motor 33 or other source of power.

A means is also provided for rotating the discs 18 and comprises transmission systems connected with the driver shaft 32. In detail, pulleys 34 are mounted upon the shaft 32 and engaged with belts 35 extended over pulleys 36 fixed upon shafts 37 rotatively supported in standards 38. One tooth wheel 39 is fixed upon the shafts 37 and mesh with gears 40 rotatively supported and connected with chains 41 extended over sprockets rotatively supported and carrying worms 43 meshing with worm wheels 44 fixed upon shafts 45 fixedly connected with the discs 18 and rotatively supported. The arrangement causes the display and carrier discs 18 to rotate very slowly due to the one tooth wheel 39.

The chutes 17 are so constructed that they have restricted free ends 46 adapted to hold the dishes of ice cream from complete discharging and necessitating the dropping of the dishes within the openings 20 before transfer is possible to the display and carrier discs 18. As the discs 18 rotate the openings 20 will pass beneath the discharge ends of the chutes 17 and if these openings are empty, then the dishes will engage therein.

Immediately to the front of the conveyors 22, and beneath the edges of the display and carrier discs 18 there is located a mechanism adapted to move the dishes from the openings 20 in the discs 18 to locations where the hooks 27 of the spiders may transfer them to the conveyors 22. This mechanism comprises springs 50 normally urged by their own resilient action against the bottoms of the discs 18 and each supported upon a rod 51 adjustably clampable on a bracket 52. The rod 51 is formed with a slot 53 through which a wing nut 54 passes and said nut being mounted upon the bracket 52 so that clamping is possible.

The bracket 52 may be raised to various positions to obtain proper action of the springs 50 by reason of being mounted upon a stem 55 adjustable in a support 56. The arrangement is such that as the discs 18 rotate the openings 20 will pass the springs 50 in succession and the springs 50 will smartly engage into the openings and throw the dishes out so that they rest upon the tops of the discs 18 adjacent the openings.

The dishes containing the ice cream shown in detail in Fig. 8 are of greater height than the dishes which simulate dishes of ice cream, and the spiders 26 are located at such heights from the tops of the discs 18 so as to cause transferring of the ice cream dishes only upon the conveyors 22, and not the dummy dishes. Reference numeral 57 represents an ice cream dish and 58 the ice cream. Numeral 59 indicates the dish having the imitation ice cream 60. The dish 59 and the imitation ice cream 60 act as weights within the openings 20 for controlling mechanism for not discharging syrup as the dummy dishes pass the containers of syrup as hereinafter further described.

Syrup or juice containers 61 are supported within the compartments 16 and each is provided at its bottom end with a discharge control comprising a bottom support plate 62 stationarily supported and having a single discharge opening 63. A cup 64 is rotatively mounted upon the plate 62 and beneath the tank 61. A plurality of pipes 65 are engaged through the cup 64 and are adapted to be selectively positioned in alignment with single opening 66 formed in the bottom of the tank 61. The openings 63 and 66 preferably are located at 180° from each other so that certain of the tubes 65 are filled with the syrup juice and ready to discharge through the opening 63 upon proper positioning of the cup 64.

Figure 4:
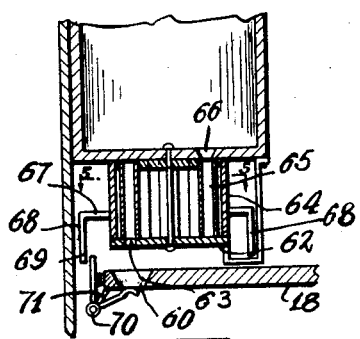
Fig. 4 is a fragmentary sectional view of one of the syrup tanks used in the device and the mechanism associated therewith.
Figure 5:
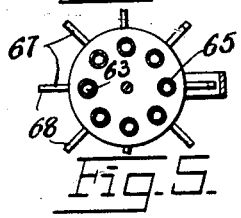
Fig. 5 is a bottom view of the syrup tank shown in Fig. 4.

A plurality of radial arms 67 project from the outside of the cup 64 and have ends 68 adapted to be engaged by the ends of bellcranks 69 pivotally mounted intermediately at 70 upon brackets 71 secured upon the discs 18. The bottom arm of the bellcranks 69 engages against the bottom of the discs 18 and is adapted to move into the openings 20 as allowed by the dishes within the openings to cause turning of the cup 64 to discharge or not to discharge syrup. Expansion springs 72 act between the discs 18 and the bellcranks 69 to normally urge them into a neutral position. As shown in Fig. 4 the discs 18 may rotate without causing any discharge of syrup. In this particular case one of the dummy ice cream dishes is located in the openings 20 shown. In the event that the openings 20 carry a dish of ice cream the bellcranks are caused to pivot to a position in which their upper ends are in the path of the down turned end 68 of one of the radial arms 67 so that upon turning of the discs 18, the cup 64 will be turned to a position in which the next pipe 65 aligns with the opening 63 and discharges its syrup upon the dish of ice cream which is immediately below.

Baffles 73 are mounted upon the bottoms of the chutes 17 and act against the tops of the discs 18 in a manner so as to cause the dummy dishes which have been removed from the openings 20, now resting upon the tops of the discs 18 to be again located within the openings 20. A signal board 74 is positioned upon the front of each of the compartments 16 and connected and adapted to signal at the rear 75 so that the man at the rear knows what the man at the front orders. The details of this signalling system and the different symbols notating different items will not be given in detail here, since such signalling systems are generally known.

Figure 6:
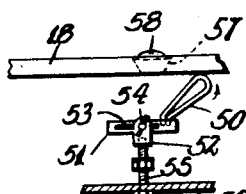
Fig. 6 is an enlarged detailed sectional view taken on the line 6—6 of Fig. 1.
Figure 7:
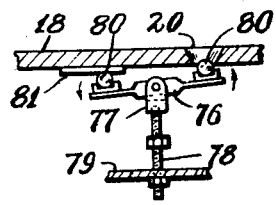
Fig. 7 is a view similar to Fig. 6 but illustrating a modified form of the invention.

In Fig. 7 a variation of the mechanism shown in Fig. 6 has been disclosed. This mechanism as previously cited is for the purpose of throwing the dishes from the openings 20 in the discs 18. As shown, there is a pivoted arm 76 located upon a bracket 77 adjustable by reason of being mounted upon a stem 78 adjustable in a support 79. Dome shaped members 80 are mounted upon the ends of the lever 76. One of the dome shaped members 80 is located in a position so as to extend through the openings 20 as the discs 18 rotate. The other dome shaped member 80 is adapted to engage against ribs 81 mounted upon the bottom of the discs 18 in locations adapted to cause pivoting of the lever 76 for the proper ejection of the dish from the opening 20.

In operation clerks stand behind the counter 13 to the outer sides of the display and carrier discs 18 and receive orders from persons or waiters to the front of the counter. These orders are communicated by the signalling system 74, 75 to the rear. Clerks at the rear fill the orders and place the dishes of ice cream upon the chutes 17. These dishes discharge to the ends of the chutes and are there held ready for engagement upon the discs 18. The clerks at the rear remove the dummy dishes from the openings 20 in numbers corresponding with the ice cream dishes desired to be dispensed. Consequently one of the openings 20, not engaged by a dish, passes beneath the discharging end of the chutes 17 and receives the dish of ice cream. As this dish passes the juice or syrup tanks it will receive a supply of the juice or syrup by reason of the bellcranks 69 co-acting with the radial arms 67 as previously described.

Upon further rotation of the discs 18 the dishes pass the ejecting means shown in detail in Fig. 6 or Fig. 7 and are moved out from the openings 20 and assume positions on the tops of the discs 18. The hooked portions 27 of the spiders 26 engage the dishes with the ice cream and move them upon the conveyors 22. The dummy dishes with ice cream are not high enough to be engaged by hooks 27, or the arms of the spiders which merely pass thereover. Dishes placed upon the conveyors 22 will be discharged on to the front counter 13.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In an ice cream dispenser, a back counter, a front counter, a dispenser casing between said counters, a display and a carrier disc rotatively mounted in said dispenser casing and partially viewable from the front and having apertures for receiving dishes of ice cream and dummy dishes of ice cream, a loading chute extending from the back counter and terminating on the top of said display and carrier disc, a conveyor from one side of said display and carrier disc discharging on to said front counter, means for rotating said display and carrier disc, means for moving ice cream containers from said disc upon said conveyor, syrup tanks supported upon said dispenser casing, and means for discharging the syrup upon the ice cream containers as they pass from the loading chute to the discharge conveyor.

2. In an ice cream dispenser, a back counter, a front counter, a dispenser casing between said counters, a display and carrier disc rotatively mounted in said dispenser casing and partially viewable from the front and having apertures for receiving dishes of ice cream and dummy dishes of ice cream, a loading chute extending from the back counter and terminating on the top of said display and carrier disc, a conveyor from one side of said display and carrier disc discharging on to said front counter, means for rotating said display and carrier disc, means for moving ice cream containers from said disc upon said conveyor, syrup tanks supported upon said dispenser casing, and means for discharging the syrup upon the ice cream containers as they pass from the loading chute to the discharge conveyor, said dispensing casing including a back wall completely closing off the back counter from view.

3. In an ice cream dispenser, a back counter, a front counter, a dispenser casing between said counters, a display and carrier disc rotatively mounted in said dispenser casing and partially viewable from the front and having apertures for receiving dishes of ice cream and dummy dishes of ice cream, a loading chute extending from the back counter and terminating on the top of said display and carrier disc, a conveyor from one side of said display and carrier disc discharging on to said front counter, means for rotating said display and carrier disc, means for moving ice cream containers from said disc upon said conveyor, syrup tanks supported upon said dispenser casing, and means for discharging the syrup upon the ice cream containers as they pass from the loading chute to the discharge conveyor, said dispensing casing including a back wall completely closing off the back counter from view, and said dispensing casing having openings through which said loading chute passes.

4. In an ice cream dispenser, a back counter, a front counter, a dispenser casing between said counters, a display and carrier disc rotatably mounted in said dispenser casing and partially viewable from the front and having apertures for receiving dishes of ice cream and dummy dishes of ice cream, a loading chute extending from the back counter and terminating on the top of said display and carrier disc, a conveyor from one side of said display and carrier disc discharging on to said front counter, means for rotating said display and carrier disc, means for moving ice cream containers from said disc upon said conveyor, syrup tanks supported upon said dispenser casing, and means for discharging the syrup upon the ice cream containers as they pass from the loading chute to the discharge conveyor, said loading chute terminating in prongs holding the ice cream cups over said disc in a manner so that the ice cream cups may fall into openings in said disc.

5. In an ice cream dispenser, a back counter, a front counter, a dispenser casing between said counters, a display and carrier disc rotatively mounted in said dispenser casing and partially viewable from the front and having apertures for receiving dishes of ice cream and dummy dishes of ice cream, a loading chute extending from the back counter and terminating on the top of said display and carrier disc, a conveyor from one side of said display and carrier disc discharging on to said front counter, means for rotating said display and carrier disc, means for moving ice cream containers from said disc upon said conveyor, syrup tanks supported upon said dispenser casing, and means for discharging the syrup upon the ice cream containers as they pass from the loading chute to the discharge conveyor, said conveyor including a mechanism for moving the ice cream containers from the disc upon the conveying portion thereof.

6. In an ice cream dispenser, a back counter, a front counter, a dispenser casing between said counters, a display and carrier disc rotatively mounted in said dispenser casing and partially viewable from the front and having apertures for receiving dishes of ice cream and dummy dishes of ice cream, a loading chute extending from the back counter and terminating on the top of said display and carrier disc, a conveyor from one side of said display and carrier disc discharging on to said front counter, means for rotating said display and carrier disc, means for moving ice cream containers from said disc upon said conveyor, syrup tanks supported upon said dispenser casing, and means for discharging the syrup upon the ice cream containers as they pass from the loading chute to the discharge conveyor, said means for rotating said disc including a speed reduction unit and driver means.

7. In an ice cream dispenser, a back counter, a front counter, a dispenser casing between said counters, a display and carrier disc rotatively mounted in said dispenser casing and partially viewable from the front and having apertures for receiving dishes of ice cream and dummy dishes of ice cream, a loading chute extending from the back counter and terminating on the top of said display and carrier disc, a conveyor from one side of said display and carrier disc discharging on to said front counter, means for rotating said display and carrier disc, means for moving ice cream containers from said disc upon said conveyor, syrup tanks supported upon said dispenser casing, and means for discharging the syrup upon the ice cream containers as they pass from the loading chute to the discharge conveyor, said means for moving the ice cream containers to said conveyor comprising resilient means beneath said disc adapted to strike the bottoms of dishes in the openings of said disc and cause the dishes to move and assume positions on the top of said disc.

8. In an ice cream dispenser, a back counter, a front counter, a dispenser casing between said counters, a display and carrier disc rotatively mounted in said dispenser casing and partially viewable from the front and having apertures for receiving dishes of ice cream and dummy dishes of ice cream, a loading chute extending from the back counter and terminating on the top of said display and carrier disc, a conveyor from one side of said display and carrier disc discharging on to said front counter, means for rotating said display and carrier disc, means for moving ice cream containers from said disc upon said conveyor, syrup tanks supported upon said dispenser casing, and means for discharging the syrup upon the ice cream containers as they pass from the loading chute to the discharge conveyor, said means for moving the ice cream containers to said conveyor comprising resilient means beneath said disc adapted to strike the bottoms of dishes in the openings of said disc and cause the dishes to move and assume positions on the top of said disc, said resilient means being adjustable so as to obtain proper action.

9. In an ice cream dispenser, a back counter, a front counter, a dispenser casing between said counters, a display and carrier disc rotatively mounted in said dispenser casing and partially viewable from the front and having apertures for receiving dishes of ice cream and dummy dishes of ice cream, a loading chute extending from the back counter and terminating on the top of said display and carrier disc, a conveyor from one side of said display and carrier disc discharging on to said front counter, means for rotating said display and carrier disc, means for moving ice cream containers from said disc upon said conveyor, syrup tanks supported upon said dispenser casing, and means for discharging the syrup upon the ice cream containers as they pass from the loading chute to the discharge conveyor, comprising a discharge mechanism on the bottom of said syrup tank controlled by motion of radial pegs thereon, and means associated with said disc for engaging said radial pegs to cause discharging of the syrup.

10. In an ice cream dispenser, a back counter, a front counter, a dispenser casing between said counters, a display and carrier disc rotatively mounted in said dispenser casing and partially viewable from the front and having apertures for receiving dishes of ice cream and dummy dishes of ice cream, a loading chute extending from the back counter and terminating on the top of said display and carrier disc, a conveyor from one side of said display and carrier disc discharging on to said front counter, means for rotating said display and carrier disc, means for moving ice cream containers from said disc upon said conveyor, syrup tanks supported upon said dispenser casing, and means for discharging the syrup upon the ice cream containers as they pass from the loading chute to the discharge conveyor, said means for moving the ice cream containers to the conveyor comprising a pivoted lever adjustably mounted, ribs upon said disc engageable against one end of said lever to cause the other end to move upwards and so move the ice cream container from its place within the openings of said disc.

In testimony whereof I have affixed my signature.

ARTHUR D. MARROS.